United States Patent
Wei

(10) Patent No.: US 9,903,533 B2
(45) Date of Patent: Feb. 27, 2018

(54) TRIAXIAL STABILIZER FOR MOBILE PHONE

(71) Applicant: Guilin Feiyu Technology Corporation Ltd., Guangxi (CN)

(72) Inventor: Chengyun Wei, Guangxi (CN)

(73) Assignee: GUILIN FEIYU TECHNOLOGY CORPORATION LTD., Guilin (CN)

( * ) Notice: Subject to any disclaimer, the term of this patent is extended or adjusted under 35 U.S.C. 154(b) by 0 days.

(21) Appl. No.: 15/176,215

(22) Filed: Jun. 8, 2016

(65) Prior Publication Data

US 2017/0307136 A1   Oct. 26, 2017

(30) Foreign Application Priority Data

Apr. 20, 2016   (CN) .......................... 2016 1 0247946
Apr. 20, 2016   (CN) ...................... 2016 2 0336375 U

(51) Int. Cl.
   *F16M 13/04*    (2006.01)
   *F16M 11/12*    (2006.01)
   *G03B 17/56*    (2006.01)

(52) U.S. Cl.
   CPC ............ *F16M 13/04* (2013.01); *F16M 11/12* (2013.01); *G03B 17/561* (2013.01); *G03B 17/56* (2013.01); *G03B 17/563* (2013.01); *G03B 17/566* (2013.01); *G03B 17/568* (2013.01)

(58) Field of Classification Search
   None
   See application file for complete search history.

(56) References Cited

U.S. PATENT DOCUMENTS

| 2015/0261070 | A1* | 9/2015  | Feng ..................... G03B 17/561 396/421 |
| 2016/0083110 | A1* | 3/2016  | Pan ........................ G03B 17/561 348/144 |
| 2016/0246162 | A1* | 8/2016  | Niemeyer ............... F16M 11/18 |
| 2016/0290556 | A1* | 10/2016 | Choi ...................... F16M 13/022 |
| 2016/0381271 | A1* | 12/2016 | Cheng ................... F16M 11/041 348/208.2 |
| 2017/0037995 | A1* | 2/2017  | Pan ......................... F16M 11/18 |
| 2017/0064176 | A1* | 3/2017  | Kim ....................... H04N 5/2328 |

(Continued)

OTHER PUBLICATIONS

DJI Osmo Mobile Smartphone Stabilizer Information (The Verge Website Review—Sep. 1, 2016; Product Webpage).*

(Continued)

*Primary Examiner* — Justin P Misleh

(57) ABSTRACT

The present invention discloses a triaxial stabilizer for mobile phone, comprising a handheld part, a fixing device for mobile phone, and three motors which are arranged at top of the handheld part and are orthogonal in a space, wherein the three motors are respectively an X-axis motor, a Y-axis motor, and a Z-axis motor, wherein the Z-axis motor has a stator connected with the handheld part and has a rotor connected with a stator of the Y-axis motor, the Y-axis motor has a rotor connected with a stator of the X-axis motor, and the X-axis motor has a rotor connected with the fixing device for mobile phone. The triaxial stabilizer for mobile phone according to the present invention may quickly stabilize the mobile phone and control its shooting direction during moving shooting.

8 Claims, 3 Drawing Sheets

(56) References Cited

U.S. PATENT DOCUMENTS

2017/0227162 A1* 8/2017 Saika .................... F16M 13/02

OTHER PUBLICATIONS

Lanparte LA3D-52 Smartphone Stabilizer Information (Product Webpage Archive—Sep. 28, 2016; User Manual).*
Lanparte HHG-01 Smartphone Stabilizer Information (Rick's Review Website Review—Sep. 8, 2015; User Manual).*
Big Balance Husky HY3M Smartphone Stabilizer Information (4K Shooters Website Review—Jan. 11, 2015; Product Webpage).*
Swiftcam M3S Smartphone Stabilizer Information (MacProVideo Website Review—Dec. 7, 2015; User Manual).*

* cited by examiner

TRIAXIAL STABILIZER FOR MOBILE PHONE

CROSS-REFERENCE TO RELATED APPLICATIONS

The present application claims the benefit of Chinese Patent Application No. 201610247946.7 filed on Apr. 20, 2016 and Chinese Utility Model Application No. 201620336375.X filed on Apr. 20, 2016, the contents of which are hereby incorporated by reference.

FIELD OF THE INVENTION

The present invention relates to a device for stabilizing shooting equipment, more particular to a triaxial stabilizer for mobile phone.

BACKGROUND OF THE INVENTION

The stabilizer is used for fixing a target object and adjusting its position, e.g. controlling its direction and its rolling and pitching movement, and for stabilizing it at a defined position, so as to realize a stable and smooth multi-angle shooting. Usually, the target objects are video cameras and photo cameras. Now, mobile phones are convenient for photographing and are used more and more. However, few stabilizers may be applied to the mobile phones.

SUMMARY OF THE INVENTION

The present invention aims to solve a technical problem of providing a triaxial stabilizer for mobile phone which may quickly stabilize the mobile phone during moving shooting and may control its shooting direction.

In order to solve the above technical problem, the present invention provides a triaxial stabilizer for mobile phone, comprising a handheld part, a fixing device for mobile phone, and three motors, an X-axis motor, a Y-axis motor, and a Z-axis motor, which are arranged at top of the handheld part and are orthogonal in a space, wherein the Z-axis motor has a stator connected with the handheld part and has a rotor connected with a stator of the Y-axis motor, the Y-axis motor has a rotor connected with a stator of the X-axis motor, and the X-axis motor has a rotor connected with the fixing device for mobile phone.

In a preferred embodiment, the triaxial stabilizer for mobile phone further comprises a button control circuit and a motor control circuit, wherein the signal output of the button control circuit is connected with the signal input of the motor control circuit, and the signal output of the motor control circuit is connected with the X-axis motor, the Y-axis motor, and the Z-axis motor, respectively.

In a preferred embodiment, the button control circuit is arranged within the handheld part, with buttons thereof protruding out of the handheld part, wherein the buttons include a four-direction navigation key, a function button and a shutter button, and wherein the handheld part is further arranged with an indicator light.

In a preferred embodiment, the button control circuit may be connected with the mobile phone by wireless communication.

In a preferred embodiment, the fixing device for mobile phone comprises clamps, a backboard, and an elastic mechanism, wherein the clamps include an upper clamp and a lower clamp which are respectively connected to two ends of the backboard by the elastic mechanism, and the backboard is fixedly connected with the rotor of the X-axis motor.

In a preferred embodiment, the elastic mechanism includes springs and cylinders. The backboard is arranged with cylindrical holes at its two sides. One end of the cylinder is fixedly connected to the clamp, and the other end of the cylinder is retractably connected to the cylindrical hole. The spring is connected between individual cylinder and individual cylindrical hole.

In a preferred embodiment, the rotor of the Z-axis motor is connected with the stator of the Y-axis motor via a first extension arm, the rotor of the Y-axis motor is connected with the stator of the X-axis motor via a second extension arm, and the rotor of the X-axis motor is connected with the fixing device for mobile phone via a third extension arm.

In a preferred embodiment, the handheld part may be provided with an USB interface, which has one end connected to the motor control circuit and another end connected to an external device.

In a preferred embodiment, mounting holes for connecting with external mount supports may be respectively arranged at the top and the bottom of the handheld part.

In a preferred embodiment, the handheld part may be arranged with a battery compartment, in which batteries may be provided to supply electricity for the triaxial stabilizer for mobile phone.

Compared with the existing devices, the triaxial stabilizer for mobile phone according to the present invention has advantages as follows: due to the three motors orthogonally arranged in the space, the triaxial stabilizer for mobile phone according to the present invention enables the mobile phone to be freely rotated in the three-dimensional space, facilitating a multi-angle shooting at relatively consistent shooting angles, and thereby realizing quickly stabilizing and controlling of the mobile phone during moving shooting. In addition, the triaxial stabilizer for mobile phone according to the present invention has a small size and is easy to carry.

BRIEF DESCRIPTION OF THE DRAWINGS

In order to better explain the embodiments of the present invention, figures are simply introduced as follows.

DETAILED DESCRIPTION OF ILLUSTRATED EMBODIMENTS

The present invention is further clearly and completely explained below in conjunction with figures. It is evident that the described embodiments are merely exemplary but not limited. Those skilled in the art may change or modify the embodiments to obtain equivalents without departing from the scope of the present invention.

Figure 1:
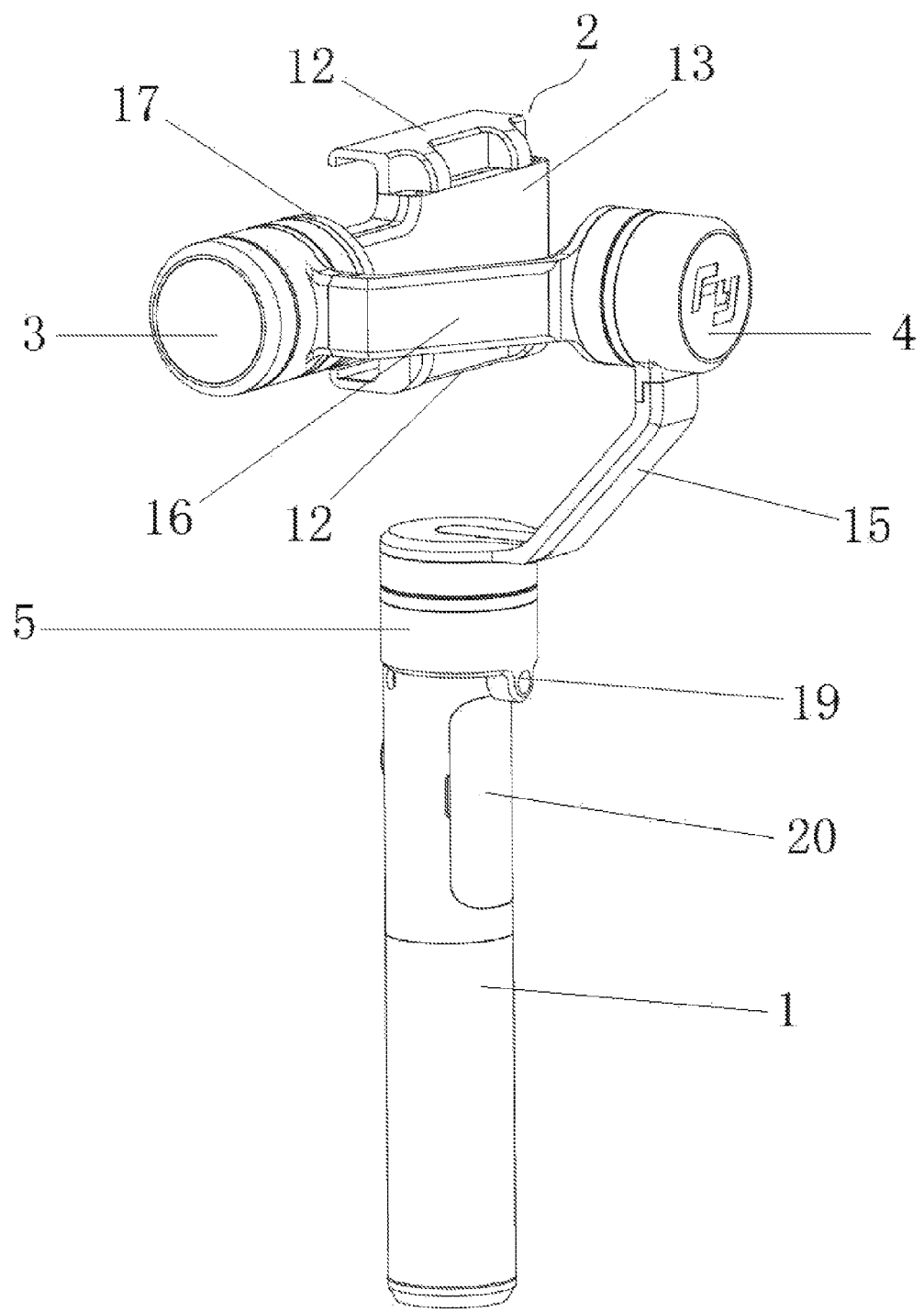
FIG. 1 is a perspective drawing of a triaxial stabilizer for mobile phone according to a preferred embodiment of the present invention.
Figure 2:
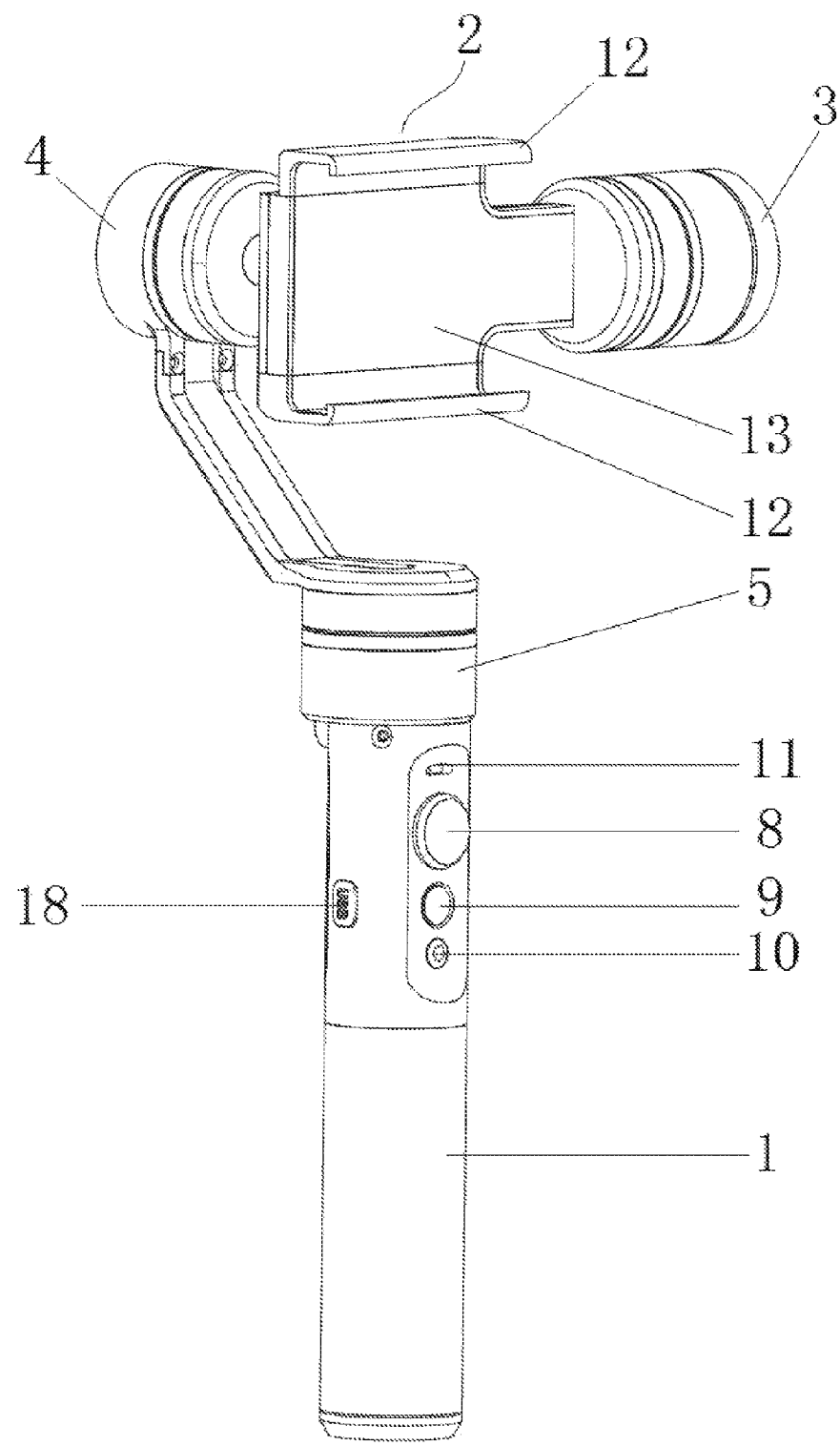
FIG. 2 is another perspective drawing of the triaxial stabilizer for mobile phone as shown in FIG. 1 from a different direction.
Figure 3:
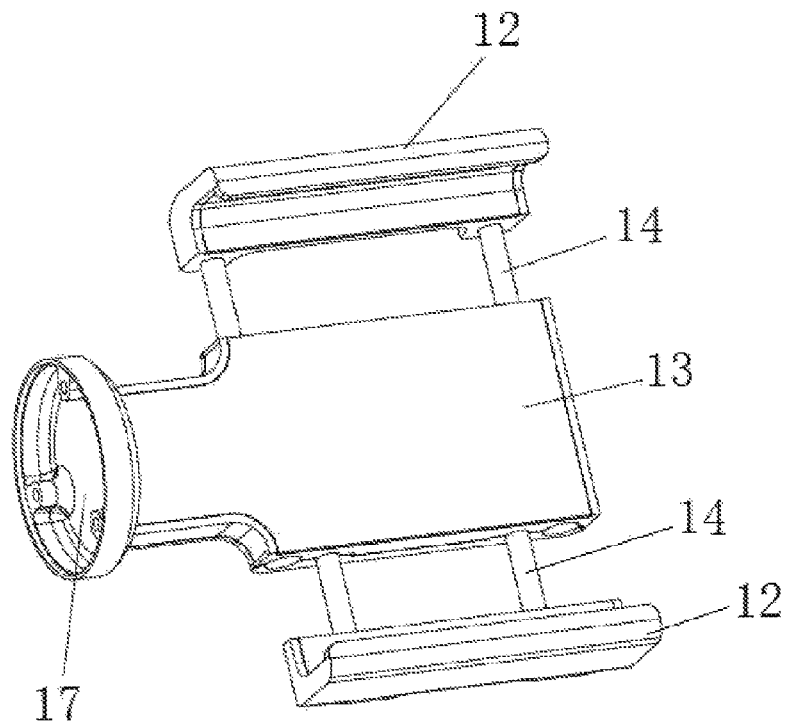
FIG. 3 is schematic view of the fixing device for the mobile phone of the triaxial stabilizer as shown in FIG. 1.
Figure 4:
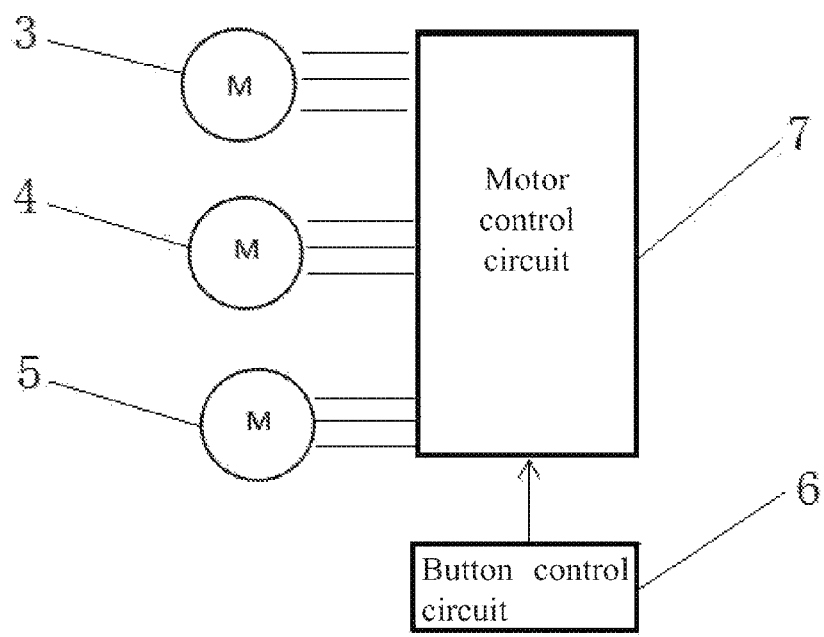
FIG. 4 is a schematic diagram of a triaxial stabilizer for mobile phone according to the present invention.

Referring to FIGS. 1-4, the triaxial stabilizer for mobile phone according to a preferred embodiment of the present invention comprises a handheld part 1, a fixing device 2 for mobile phone, and three motors, an X-axis motor 3, a Y-axis motor 4, and a Z-axis motor 5, which are arranged at top of the handheld part 1 and are orthogonal in a space, wherein the Z-axis motor 5 has a stator connected with the handheld part 1 and has a rotor connected with a stator of the Y-axis motor 4, the Y-axis motor 4 has a rotor connected with a stator of the X-axis motor 3, and the X-axis motor 3 has a rotor connected with the fixing device 2 for mobile phone. Herein, the stator refers to a fixed part of the motor, and the rotor refers to a rotating part of the motor. The X-axis motor 3 is used for controlling pitching movement of the fixing device 2 for mobile phone, the Y-axis motor 4 is used for controlling rolling movement of the fixing device 2 for mobile phone, and the Z-axis motor 5 is used for controlling the yawing movement of the fixing device 2 for mobile phone. In this way, a mobile phone in a three-dimensional space may be rotated along with the three motors orthogonally arranged in the space, and a multi-angle shooting at relatively consistent shooting angles may be realized.

Regarding the arrangement for the controlling of three motors, the triaxial stabilizer for mobile phone further comprises a button control circuit 6 and a motor control circuit 7. The signal output of the button control circuit 6 is connected with the signal input of the motor control circuit 7, and the signal output of the motor control circuit 7 is connected with the X-axis motor 3, the Y-axis motor 4, and the Z-axis motor 5, respectively. In this way, movements of the three motors are controlled by the motor control circuit 7 on the basis of the instruction signals sent from the button control circuit 6. It should be noted that an angle limit mechanism is arranged inside the X-axis motor 3 and the Y-axis motor 4, so that the X-axis motor 3 and the Y-axis motor 4 may be free to rotate at angles in their limited range, and the Z-axis motor 5 may be free to rotate 360 degrees. Preferably, the rotating shafts of the three motors may be hollow shafts, each with a slip ring arranged inside, so that the control line or electric wire passing through the motor would not rotate along with the motor.

In order to provide a rational arrangement and facilitate the operation, the handheld part 1 may be hollow inside. The button control circuit 6 is arranged in the handheld part 1, with buttons thereof protruding out of the handheld part 1.

The buttons include a four-direction navigation key 8, a function button 9 and a shutter button 10. In the present embodiment, the movements of the X-axis motor 3 and the Z-axis motor 5 may be controlled by means of the four-direction navigation key 8. When an up key or a down key of the four-direction navigation key 8 is pressed, the rotating shaft of the X-axis motor 3 is rotated to lead the fixing device 2 for mobile phone to perform pitching movement. When a left key or a right key of the four-direction navigation key 8 is pressed, the rotating shaft of the Z-axis motor 5 is rotated to lead the fixing device 2 for mobile phone to perform yawing movement. Furthermore, when the function button 9 is pressed, the fixing device 2 for mobile phone may be switched between four working modes. For example, when the function button 9 is pressed for one time, the fixing device 2 for mobile phone is switched to a yawing movement following mode (i.e. the Z-axis motor 5 is in an enabled state), in which pitch axis and roll axis are locked (i.e. both the X-axis motor 3 and the Y-axis motor 4 are in a lock state), and yaw axis is smoothly rotated according to the instruction from the four-direction navigation key 8 which is manually operated. When the function button 9 is pressed for successive two times, the fixing device 2 for mobile phone may be switched to a yawing movement and pitching movement following mode (i.e. both the Z-axis motor 5 and the X-axis motor 3 are in an enabled state), in which roll axis is locked (i.e. the Y-axis motor 4 is in a lock state), and yaw axis and pitch axis are smoothly rotated according to the instruction from the four-direction navigation key 8 which is manually operated. When the function button 9 is long-pressed for one second, the fixing device 2 for mobile phone may be switched to a locking mode, in which yaw axis, pitch axis and roll axis are all locked (i.e. the X-axis motor 3, the Y-axis motor 4 and the Z-axis motor 5 are all in a lock state). Moreover, an indicator light 11 may be arranged above the function button 9 for indicating the working modes. The shutter button 10 is used for confirming photo and video shooting. For example, if the mobile phone is in a photo mode, it takes a photo when the shutter button 10 is clicked, and if the mobile phone is in a record mode, it starts to record when the shutter button 10 is clicked and stops recording when the shutter button 10 is clicked again. It should be noted that the button control circuit 6 may be connected with the mobile phone by wireless communication, so that the mobile phone may be controlled by the four-direction navigation key 8, the function button 9 and the shutter button 10. Preferably, the wireless communication may be Bluetooth communication.

The fixing device 2 for mobile phone comprises clamps 12 for clamping the mobile phone from two sides, i.e. up side and down side, or left side and right side, a backboard 13 against the mobile phone body, and an elastic mechanism 14 for providing clamping force. In particular, the clamps 12 include an upper clamp and a lower clamp which are respectively connected to two ends of the backboard 13 by the elastic mechanism 14. The backboard 13 is fixedly connected with the rotor of the X-axis motor 3. The elastic mechanism 14 includes at least two sets of springs and cylinders respectively arranged at the two sides of the backboard 13. The backboard 13 is provided with cylindrical holes at the two sides. One end of the cylinder is fixedly connected to the clamp 12, and the other end of the cylinder is retractably connected to the individual cylindrical hole. The spring is connected between individual cylinder and individual cylindrical hole. Due to the flexibility of the spring, the mobile phones of various sizes may be clamped.

To provide enough space for the rotation of the fixing device 2 for mobile phone, the rotor of the Z-axis motor 5 is connected with the stator of the Y-axis motor 4 via a first extension arm 15, the rotor of the Y-axis motor 4 is connected with the stator of the X-axis motor 3 via a second extension arm 16, and the rotor of the X-axis motor 3 is connected with the fixing device for mobile phone via a third extension arm 17. Herein, the first extension arm 15 and the second extension arm 16 are L-shaped, each with a vertical length greater than the length of the third extension arm 17.

Preferably, the handheld part 1 may be provided with an USB interface 18, which has one end connected to the motor control circuit 7 and another end connected to an external device, preferably a computer. Due to the connection with the computer via the USB interface 18, the firmware of the stabilizer may be upgraded and the parameters of the stabilizer may be adjusted, and the stabilizer and thus the mobile phone may be controlled.

Preferably, mounting holes 19 for connecting with an external mount support may be respectively arranged at the top and the bottom of the handheld part 1.

Preferably, the handheld part 1 may be arranged with a battery compartment 20, in which batteries may be provided to supply electricity for the triaxial stabilizer for mobile phone.

In general, due to the three motors orthogonally arranged in the space, the triaxial stabilizer for mobile phone according to the present invention enables the mobile phone to be freely rotated in the three-dimensional space, facilitating a multi-angle shooting at relatively consistent shooting angles, and thereby realizing quickly stabilizing and controlling of the mobile phone during moving shooting. In addition, the triaxial stabilizer for mobile phone according to the present invention has a small size and is easy to carry.

All the above disclosed are merely the preferred embodiments of the present invention, but are not to limit the scope of the invention. The present invention is intended to cover all changes and equivalents included within the principle and the scope of the present invention.

What is claimed is:

1. A triaxial stabilizer for mobile phone, comprising a handheld part, a fixing device for mobile phone, and three motors, an X-axis motor, a Y-axis motor, and a Z-axis motor, which are arranged at top of the handheld part and are orthogonal in a space; wherein the Z-axis motor has a stator connected with the handheld part and has a rotor connected with a stator of the Y-axis motor, the Y-axis motor has a rotor connected with a stator of the X-axis motor, and the X-axis motor has a rotor connected with the fixing device for mobile phone;

the triaxial stabilizer for mobile phone further comprises a button control circuit and a motor control circuit, wherein a signal output of the button control circuit is connected with a signal input of the motor control circuit, and a signal output of the motor control circuit is connected with the X-axis motor, the Y-axis motor, and the Z-axis motor, respectively;

the button control circuit is arranged within the handheld part, with buttons thereof protruding out of the handheld part, wherein the buttons include a four-direction navigation key, a function button and a shutter button, and wherein the handheld part is further arranged with an indicator light;

the four-direction navigation key controls movements of the X-axis motor and the Z-axis motor; a rotating shaft of the X-axis motor is rotated to lead the fixing device for mobile phone to perform pitching movement when an up key or a down key of the four-direction navigation key is pressed; a rotating shaft of the Z-axis motor is rotated to lead the fixing device for mobile phone to perform yawing movement when a left key or a right key of the four-direction navigation key is pressed;

the fixing device for mobile phone is switched among different working modes as follows by means of the function button: when the function button is pressed one time, the fixing device for mobile phone is switched to a yawing movement following mode, in which the Z-axis motor is in an enabled state while both the X-axis motor and the Y-axis motor are in a lock state; when the function button is pressed two successive times, the fixing device for mobile phone is switched to a yawing movement and pitching movement following mode, in which both the Z-axis motor and the X-axis motor are in an enabled state while the Y-axis motor is in a lock state; when the function button is long-pressed for one second, the fixing device for mobile phone is switched to a locking mode, in which the X-axis motor, the Y-axis motor and the Z-axis motor are all in a lock state;

the shutter button is used for confirming photo and video shooting.

2. The triaxial stabilizer for mobile phone according to claim 1, characterized in that: the button control circuit is connected with the mobile phone by wireless communication.

3. The triaxial stabilizer for mobile phone according to claim 1, characterized in that: the fixing device for mobile phone comprises clamps, a backboard, and an elastic mechanism, wherein the clamps include an upper clamp and a lower clamp which are respectively connected to two ends of the backboard by the elastic mechanism, and the backboard is fixedly connected with the rotor of the X-axis motor.

4. The triaxial stabilizer for mobile phone according to claim 3, characterized in that: the elastic mechanism includes springs and cylinders, and the backboard is arranged with cylindrical holes at its two sides, wherein the cylinder has one end fixedly connected to the clamp and the other end retractably connected to the cylindrical hole, and wherein the spring is connected between the cylinder and the cylindrical hole.

5. The triaxial stabilizer for mobile phone according to claim 1, characterized in that: the rotor of the Z-axis motor is connected with the stator of the Y-axis motor via a first extension arm, the rotor of the Y-axis motor is connected with the stator of the X-axis motor via a second extension arm, and the rotor of the X-axis motor is connected with the fixing device for mobile phone via a third extension arm.

6. The triaxial stabilizer for mobile phone according to claim 1, characterized in that: the handheld part is provided with an USB interface, wherein the USB interface has one end connected to the motor control circuit and the other end connected to an external device.

7. The triaxial stabilizer for mobile phone according to claim 1, characterized in that: mounting holes for connecting with external mount supports are respectively arranged at the top and the bottom of the handheld part.

8. The triaxial stabilizer for mobile phone according to claim 1, characterized in that: the handheld part is arranged with a battery and a battery compartment, wherein the battery is arranged inside the battery compartment to supply electricity for the triaxial stabilizer for mobile phone.

* * * * *